United States Patent
Lee et al.

(10) Patent No.: US 8,908,351 B2
(45) Date of Patent: Dec. 9, 2014

(54) CONDUCTIVE PASTE COMPOSITION FOR INTERNAL ELECTRODE, MULTILAYER CERAMIC ELECTRONIC COMPONENT, AND METHOD OF MANUFACTURING THE SAME

(75) Inventors: Ro Woon Lee, Gyunggi-do (KR); Young Ho Kim, Gyunggi-do (KR); Yoon Hee Lee, Gyunggi-do (KR); Kyung Jin Choi, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 57 days.

(21) Appl. No.: 13/557,802

(22) Filed: Jul. 25, 2012

(65) Prior Publication Data

US 2013/0301184 A1    Nov. 14, 2013

(30) Foreign Application Priority Data

May 10, 2012    (KR) .................. 10-2012-0049602

(51) Int. Cl.
*H01G 4/30*    (2006.01)

(52) U.S. Cl.
USPC .................. 361/301.4; 361/301.2; 361/306.1; 361/306.3; 361/321.1; 361/321.2

(58) Field of Classification Search
USPC ................ 361/301.4, 301.2, 311–313, 306.1, 361/306.3, 321.1–321.5, 303–305
See application file for complete search history.

(56) References Cited

U.S. PATENT DOCUMENTS

| | | | | |
|---|---|---|---|---|
| 6,551,527 B2 * | 4/2003 | Yoshida et al. | ............... | 252/512 |
| 6,606,238 B1 * | 8/2003 | Nakamura et al. | ......... | 361/321.2 |
| 6,627,120 B2 * | 9/2003 | Shimizu | ..................... | 252/521.2 |
| 6,927,966 B2 * | 8/2005 | Miyazaki et al. | .......... | 361/321.2 |
| 7,463,477 B2 * | 12/2008 | Yoon et al. | ................. | 361/321.1 |

FOREIGN PATENT DOCUMENTS

| | | |
|---|---|---|
| JP | 58-160372 A | 9/1983 |
| JP | 2004-182951 | 7/2004 |
| JP | 2004-200450 | 7/2004 |
| JP | 2004-315853 A | 11/2004 |
| JP | 2006-161128 A | 6/2006 |
| JP | 2006-202604 A | 8/2006 |
| JP | 2006-244845 | 9/2006 |
| JP | 2008-282763 A | 11/2008 |

OTHER PUBLICATIONS

Japanese Office Action, w/English translation thereof, issued in Japanese Patent Application No. JP 2012-163435. dated Apr. 1, 2014.
Korean Office Action issued in Korean Application No. Oct. 2012-0049602 dated May 28, 2014, w/English translation.

* cited by examiner

*Primary Examiner* — Nguyen T Ha
(74) *Attorney, Agent, or Firm* — McDermott Will & Emery LLP

(57) ABSTRACT

There are provided a conductive paste composition for an internal electrode, a multilayer ceramic electronic component including the same, and a method of manufacturing the same, the conductive paste composition including: a metal powder; and an additive including at least one selected from glutamic acid, amino acids, thiols, and hydrocarbons.

12 Claims, 5 Drawing Sheets

B – B'

CONDUCTIVE PASTE COMPOSITION FOR INTERNAL ELECTRODE, MULTILAYER CERAMIC ELECTRONIC COMPONENT, AND METHOD OF MANUFACTURING THE SAME

CROSS-REFERENCE TO RELATED APPLICATIONS

This application claims the priority of Korean Patent Application No. 10-2012-0049602 filed on May 10, 2012, in the Korean Intellectual Property Office, the disclosure of which is incorporated herein by reference.

BACKGROUND OF THE INVENTION

1. Field of the Invention

The present invention relates to a conductive paste composition for an internal electrode having a highly variable viscosity, a multilayer ceramic electronic component having internal electrodes with an improved printed shape, and a method of manufacturing the same.

2. Description of the Related Art

In accordance with the recent trend for the miniaturization of electronic products, multilayer ceramic electronic components have also been required to have a small size and large capacitance.

Therefore, various methods have been used to thin and highly multilayer dielectric layers and internal electrodes. Recently, as the thickness of dielectric layers has been reduced, multilayer ceramic electronic components having an increased number of laminations have been manufactured.

In addition, in order to allow internal electrodes to be thinner, ceramic electronic components having internal electrodes formed by using a fine metal powder have recently been manufactured.

Meanwhile, an internal electrode paste has been prepared in two types, a screen type and a gravure type. Also, as necessary, the internal electrode paste has been provided with a low viscosity for use.

However, when a low-viscosity paste is used, problems with respect to contact angles at printed ends of the screen and gravure may occur. For example, when the internal electrode is formed by using a low-viscosity paste, an end of the internal electrode may have a dome shape.

When the end of the internal electrode has a dome shape, defective alignment may occur in a lamination stage in which ceramic green sheets on which the paste for an internal electrode is printed are laminated in several layers. Further, after the laminated ceramic green sheets are sintered, an end portion of the internal electrode is highly likely to be disconnected. Further, disconnection of the end portion of the internal electrode may cause a decrease in capacitance of the multilayer ceramic capacitor.

The problem that the end of the internal electrode has a dome shape may be somewhat ameliorated by improving the printing process, but the improvement degree thereof has a limitation.

RELATED ART DOCUMENTS

Japanese Laid-Open Publication No. 2004-182951

SUMMARY OF THE INVENTION

An aspect of the present invention provides a conductive paste composition for an internal electrode having a large difference in viscosity in a process of manufacturing a multilayer ceramic electronic component.

Another aspect of the present invention provides a method of manufacturing a multilayer ceramic electronic component capable of improving a contact angle defect of the conductive paste for an internal electrode.

Another aspect of the present invention provides a multilayer ceramic electronic component and a method of manufacturing the same, capable of improving phase stability of the conductive paste for an internal electrode.

Another aspect of the present invention provides a multilayer ceramic electronic component in which an end of the internal electrode has a shape close to a right angle, and a method of manufacturing the same.

Another aspect of the preset invention provides a multilayer ceramic electronic component in which roughness (surface roughness) of the internal electrode is improved by improving a leveling property of the conductive paste for an internal electrode, the leveling being a function of leveling a surface.

According to an aspect of the present invention, there is provided a conductive paste composition for an internal electrode, the conductive paste composition including: a metal powder; and an additive including at least one selected from glutamic acid, amino acids, thiols, and hydrocarbons.

The additive may be a monomer.

When the additive includes at least one selected from the glutamic acid and the amino acids, the additive may have a content of 0.5 to 2 wt %.

When the additive includes at least one selected from the thiols and the hydrocarbons, the additive may have a content of 0.1 to 0.4 wt %.

The conductive paste composition may have a viscosity varied within the range of 1 to 1000 Pa·s.

According to another aspect of the present invention, there is provided a method of manufacturing a multilayer ceramic electronic component, the method including: preparing ceramic green sheets; printing a conductive paste for an internal electrode on the respective ceramic green sheets, the conductive paste including a metal powder, a solvent, a binder, and an additive; and laminating the ceramic green sheets on which the conductive paste for an internal electrode is printed, wherein the additive includes at least one selected from glutamic acid, amino acids, thiols, and hydrocarbons.

The additive may be a monomer.

When the additive includes at least one selected from the glutamic acid and the amino acids, the additive may have a content of 0.5 to 2 wt %.

When the additive includes at least one selected from the thiols and the hydrocarbons, the additive may have a content of 0.1 to 0.4 wt %.

In the printing of the conductive paste for an internal electrode, the conductive paste may have a viscosity varied within the range of 1 to 1000 Pa·s.

The method may further include firing the laminated ceramic green sheets.

According to another aspect of the present invention, there is provided a multilayer ceramic electronic component, manufactured by printing a conductive paste for an internal electrode including an additive, a metal powder, a solvent, and a binder, on ceramic green sheets, the additive including at least one of glutamic acid, amino acid, thiols, and hydrocarbons, and laminating the ceramic green sheets on which the conductive paste for an internal electrode is printed.

When the additive includes at least one selected from the glutamic acid and the amino acids, the additive may have a content of 0.5 to 2 wt %.

When the additive includes at least one selected from the thiols and the hydrocarbons, the additive may have a content of 0.1 to 0.4 wt %.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE EMBODIMENTS

Figure 1:
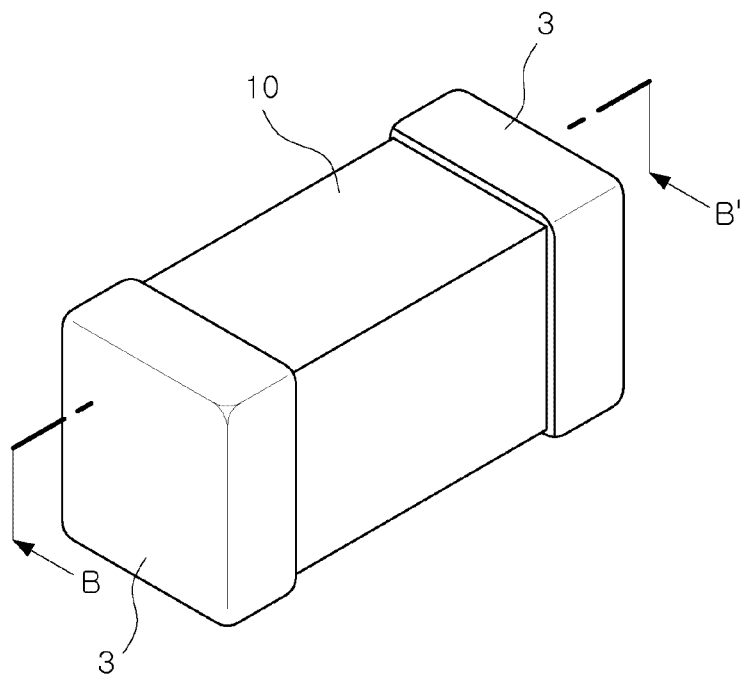
FIG. 1 is a perspective view schematically showing a multilayer ceramic capacitor according to an embodiment of the present invention.

Embodiments of the present invention will now be described in detail with reference to the accompanying drawings.

The present invention will now be described more fully with reference to the accompanying drawings, in which embodiments of the invention are shown.

The invention may, however, be embodied in many different forms and should not be construed as being limited to the embodiments set forth herein; rather, these embodiments may be provided so that this disclosure will be thorough and complete, and will fully convey the concept of the invention to those skilled in the art. In the drawings, the shapes and sizes of elements may be exaggerated for clarity.

The terminology used herein is for the purpose of describing particular embodiments only and is not intended to limit the inventive concept. As used herein, the singular forms "a" an and the are intended to include the plural forms as well, unless the context clearly indicates otherwise.

In addition, unless explicitly described otherwise, "comprising" any components will be understood to imply the inclusion of other components but not the exclusion of any other components.

In the drawings, the shapes and dimensions may be exaggerated for clarity, and the same reference numerals will be used throughout to designate the same or like components.

While terms such as "first" and "second," etc., may be used to describe various components, such components must not be understood as being limited to the above terms. The above terms are used only to distinguish one component from another. For example, a first component may be referred to as a second component without departing from the scope of rights of the present invention, and likewise a second component may be referred to as a first component.

Hereinafter, a multilayer ceramic electronic component according to an embodiment of the present invention, but particularly, a multilayer ceramic capacitor, will be described, but the present invention is not limited thereto.

FIG. 1 is a perspective view schematically showing a multilayer ceramic capacitor according to an embodiment of the present invention.

Figure 2:
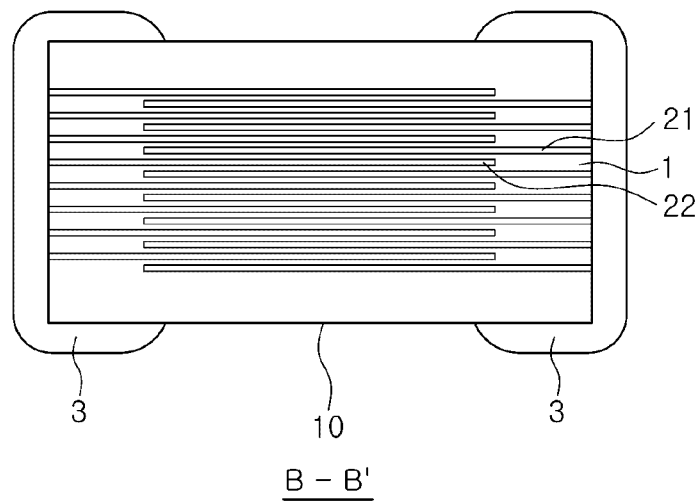
FIG. 2 is a cross-sectional view taken along line B-B' of FIG. 1.

FIG. 2 is a cross-sectional view taken along line B-B' of FIG. 1.

Referring to FIGS. 1 and 2, a multilayer ceramic capacitor according to an embodiment of the present invention may include a ceramic body 10 and external electrodes 3.

The ceramic body 10 may include dielectric layers 1, first internal electrode layers 21, and second internal electrode layers 22. In particular, the first and second internal electrode layers 21 and 22 are disposed to face each other with the dielectric layer 1 interposed therebetween.

As a material for forming the dielectric layer 1, various ceramic additives, organic solvents, plasticizers, binders, dispersive agents, or the like may be added to barium titanate ($BaTiO_3$) powder or the like, depending on the purpose of the present invention.

An average particle size of particles comprising the ceramic powder used in forming the dielectric layer 1 is not particularly limited, and may be appropriately controlled for achieving the purposes of the present invention.

The first and second inner electrode layers 21 and 22 may be formed by using a conductive paste formed of at least one of, for example, a precious metal, such as palladium (Pd), a palladium-silver (Pd—Ag) alloy, and the like, nickel (Ni), and copper (Cu), but are not limited thereto.

External electrodes 3 may be formed on external surfaces of the ceramic body 10 in order to form capacitance, and may be electrically connected with the plurality of first and second internal electrode layers 21 and 22.

The external electrodes 3 may be formed of the same conductive material as the internal electrodes, but are not limited thereto. For example, the external electrodes 3 may be formed of copper (Cu), silver (Ag), nickel (Ni), or the like.

The external electrodes 3 may be formed by coating the ceramic body 10 with a conductive paste prepared by adding glass frit to the metal powder, and then performing firing thereof.

FIGS. 3A to 3F are views showing a process of manufacturing a multilayer ceramic capacitor according to an embodiment of the present invention.

Referring to FIGS. 3A to 3F, a method of manufacturing a multilayer ceramic capacitor according to an embodiment of the present invention is provided, the method including: preparing ceramic green sheets; printing a paste for an internal electrode on respective ceramic green sheets, the paste including a metal powder, a solvent, a binder, and an additive; and laminating the ceramic green sheets on which the paste for an internal electrode is printed. The additive may include at least one selected from glutamic acid, amino acids, thiols, and hydrocarbons.

First, a conductive paste composition may be prepared by including the additive including at least one selected from glutamic acid and amino acids, and the metal powder.

In addition, the conductive paste may be used to manufacture the multilayer ceramic capacitor.

Figure 3:
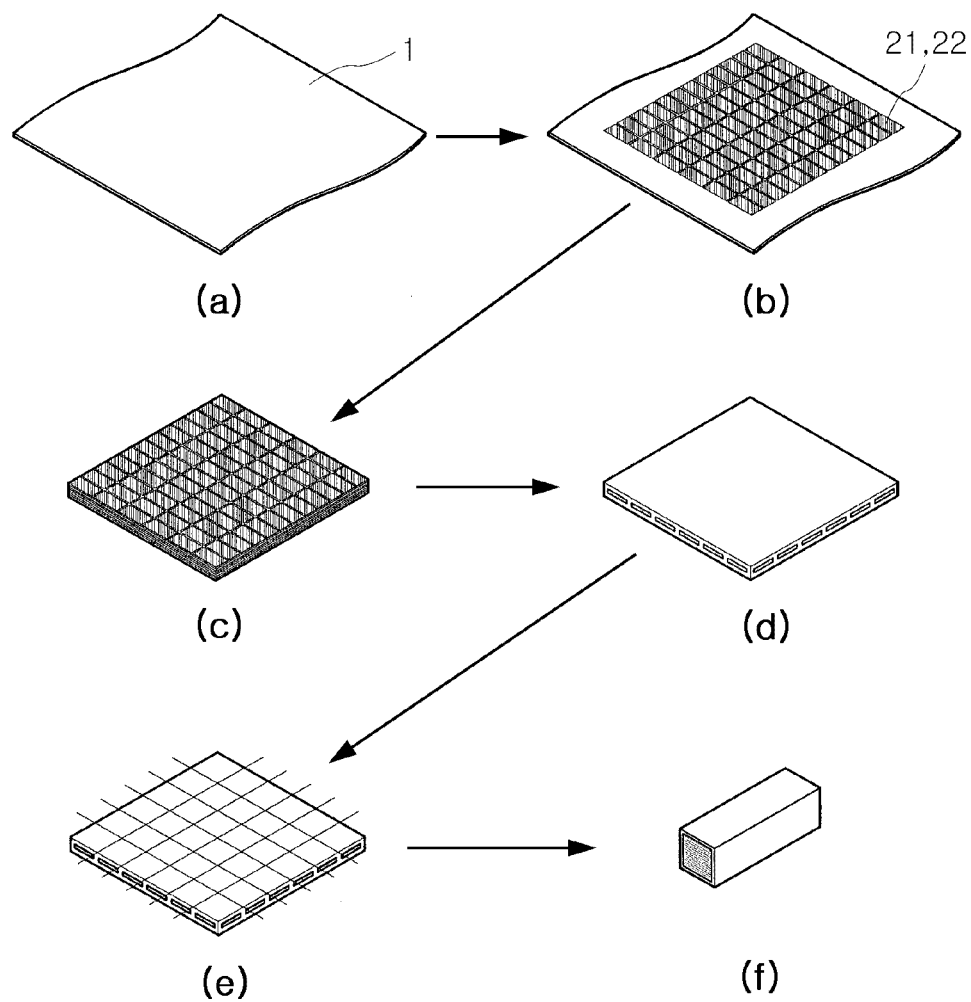
FIGS. 3A to 3F are views showing a process of manufacturing a multilayer ceramic capacitor according to an embodiment of the present invention.

First, a plurality of green sheets are prepared (FIG. 3A). As for the green sheets which are ceramic green sheets, dielectric layers 1 having a thickness of several μm may be formed by mixing barium titanate ($BaTiO_3$) powder or the like with a ceramic additive, an organic solvent, a plasticizer, a binder, and a dispersive agent.

In addition, the internal electrode layers 21 and 22 may be formed on the green sheets by using the conductive paste (FIG. 3B).

Meanwhile, the conductive paste may include an additive having at least one selected from glutamic acid and amino acids.

The additive may function as a kind of a peptizing agent. The additive has a function group having a strong carbon and hydrogen bond, and an O— group and an OH— group, and thus, has a relatively high bonding strength with the powder, the binder, or the like. Therefore, the additive may prevent agglomeration between the powder and the powder and between the binder and the binder, and may function to peptize the existing agglomeration by the high bonding strength with the powder or the binder.

In addition, the additive may include glutamic acid or amino acid, included in a type of low-molecular weight monomer.

Figure 4:
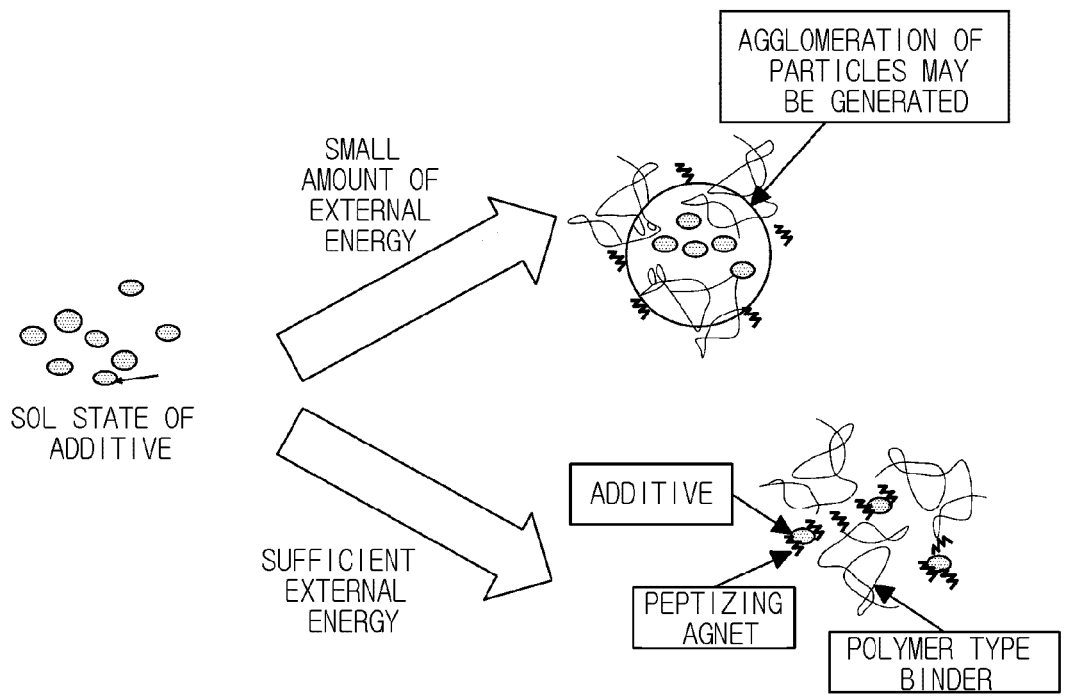
FIG. 4 is a conceptual view showing the behavior of an additive in a conductive paste.

FIG. 4 is a conceptual view showing the behavior of the additive in a conductive paste.

As shown in FIG. 4, when a sufficient amount of external energy is applied to the conductive paste, the additive may peptize an agglomeration state of the conductive paste. That is, the agglomeration state of the conductive paste may be weakened by the additive during a printing process.

In addition, when a small amount of external energy is applied to the conductive paste, the agglomeration state of the conductive paste may be strengthened due to an agglomeration effect between the additives. That is, viscosity of the conductive paste may be increased by the additive after the completion of printing.

As such, the additive may partially change an operating mechanism of the conductive paste.

Table 1 shows the composition of the existing low-viscosity conductive paste for an internal electrode.

TABLE 1

| Component | Content ratio |
| --- | --- |
| Metal powder | 40~60 wt. % |
| Sintering agent | 1~5 wt. % |
| Dispersive agent | 0.5~2 wt. % |
| Binder | 2~4 wt. % |
| Solvent | 40~60 wt. % |

Figure 5:
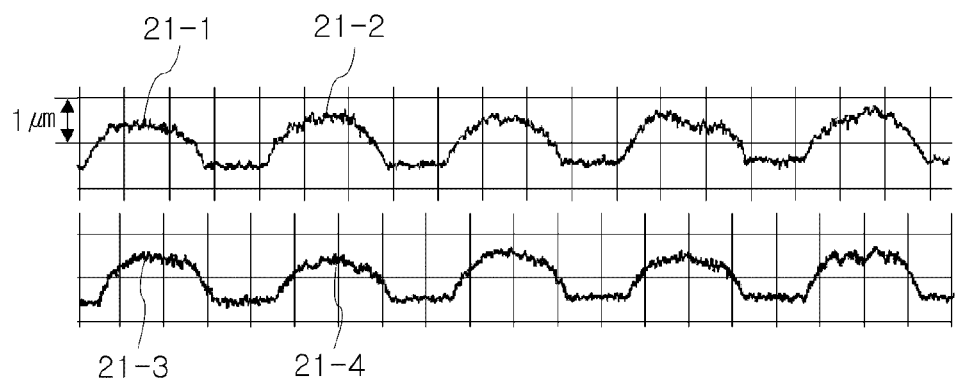
FIG. 5 is a view showing cross-sectional shapes of printed internal electrodes when the internal electrodes are printed by using a low-viscosity conductive paste for an internal electrode shown in Table 1.

FIG. 5 is a view showing cross-sectional shapes of printed internal electrodes when the internal electrodes are printed by using a low-viscosity conductive paste for an internal electrode shown in Table 1.

As shown in FIG. 5, when the existing low-viscosity conductive paste for an internal electrode is used, it can be confirmed that each of internal electrodes 21-1, 21-2, 21-3, and 21-4 had a dome shape. Further, it can be confirmed that a contact angle of respective internal electrodes 21-1, 21-2, 21-3, and 21-4 was significantly gentle.

Table 2 shows the composition of the conductive paste for an internal electrode according to an embodiment of the present invention.

TABLE 2

| Component | Content ratio |
| --- | --- |
| Metal powder | 40~60 wt. % |
| Sintering agent | 1~5 wt. % |
| Dispersive agent | 0.5~2 wt. % |
| Binder | 2~4 wt. % |
| Solvent | 40~60 wt. % |
| Additive agent | 0.5~2 wt. % |

The additive may account for 0.5 to 2 wt % in the conductive paste for an internal electrode.

The printed shape of the conductive paste for an internal electrode is influenced by stationary viscosity characteristics. The stationary viscosity characteristics of the conductive paste for an internal electrode including the additive may be confirmed by rheology behavior.

Figure 6:
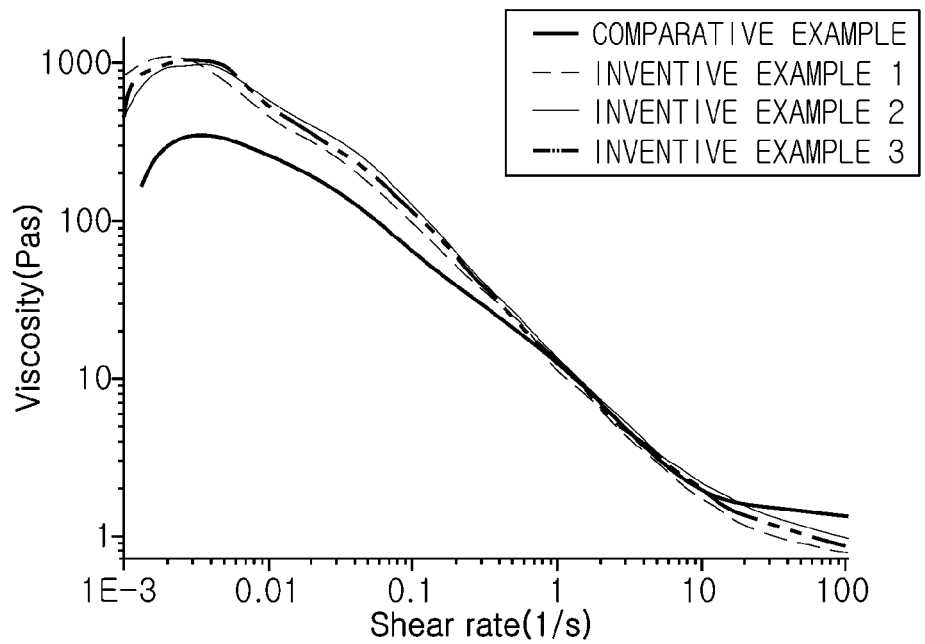
FIG. 6 is a view showing rheology behavior of a conductive paste for an internal electrode including an additive and a conductive paste for an internal electrode not including an additive.

FIG. 6 is a view showing the rheology behavior of a conductive paste for an internal electrode including an additive and a conductive paste for an internal electrode not including an additive.

Here, the Comparative Example indicates a rheology behavior result of a conductive paste for an internal electrode not including an additive; Inventive Example 1 indicates a rheology behavior result of a conductive paste for an internal electrode including an additive provided in an amount of 2 wt %; Inventive Example 2 indicates a rheology behavior result of a conductive paste for an internal electrode including an additive provided in an amount of 0.5 wt %; and Inventive Example 3 indicates a rheology behavior result of a conductive paste for an internal electrode including an additive provided in an amount of 1 wt %.

Referring to FIG. 6, viscosity values of Inventive Examples 1, 2, and 3 were lower than a viscosity value of Comparative Example in a printing viscosity region (for example, at a shear rate of 10 to 100).

In the process of forming internal electrode patterns, the conductive paste for an internal electrode may have a relatively low viscosity since the conductive paste for an internal electrode needs to form internal electrode patterns. In addition, the conductive paste for an internal electrode may form a shape close to a quadrangular-shaped pattern in the relatively low viscosity state thereof. In addition, when the viscosity ratio of the conductive paste for an internal electrode is decreased in the printing process, surface leveling properties are improved, resulting in improvement in roughness.

In addition, in the final stationary viscosity region (for example, at a shear rate of 0.1 or higher), viscosity values of Inventive Examples 1, 2, and 3 were higher than a viscosity value of Comparative Example. That is, it can be confirmed from the rheology behavior that the stationary viscosity was increased due to the addition of the additive. In this case, the contact angle between the sheet and the conductive paste for an internal electrode may be improved as compared with the related art.

Since the binder of the internal electrode may be strongly agglomerated after the process of forming the internal electrode patterns is completed, the viscosity of the conductive paste for an internal electrode may be increased. Here, strong agglomerates between particles, resins, and particle and resin, may be formed, and thus, phase stability may be improved.

Figure 7:
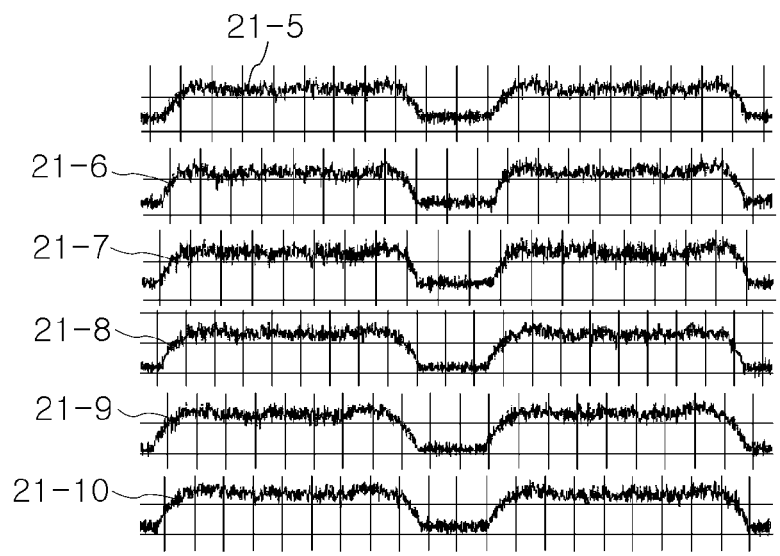
FIG. 7 is a view showing cross-sectional shapes of printed internal electrodes when the internal electrodes are printed by using a conductive paste for an internal electrode according to an embodiment of the present invention.

FIG. 7 is a view showing cross-sectional shapes of printed internal electrodes when the internal electrodes are printed by using a conductive paste for an internal electrode according to an embodiment of the present invention.

As shown in FIG. 7, it can be confirmed that, when the conductive paste for an internal electrode according to an embodiment of the present invention was used with respect to 6 types of MLCCs, the contact angles of end portions of internal electrodes 21-5, 21-6, 21-7, 21-8, 21-9, and 21-10 were improved. This results from an increase in stationary viscosity of the conductive paste for an internal electrode.

In addition, when the capacitance of an MLCC using the existing conductive paste for an internal electrode was compared with the capacitance of an MLCC using the conductive paste for an internal electrode according to an embodiment of the present invention, an improvement in capacitance of 100% or higher could be obtained.

Meanwhile, a conductive paste composition including an additive including, in addition to the additive components as described above, at least one selected from thiols and hydrocarbons, and a metal powder may be prepared.

Since the method of printing internal electrode patterns by using the conductive paste including an additive may be applied in the same manner as described above, specific descriptions thereof will be omitted.

Meanwhile, when the conductive paste composition is prepared by using an additive including at least one selected from thiols and hydrocarbons, the additive may be included in 0.1 to 0.4 wt %.

Figure 8:
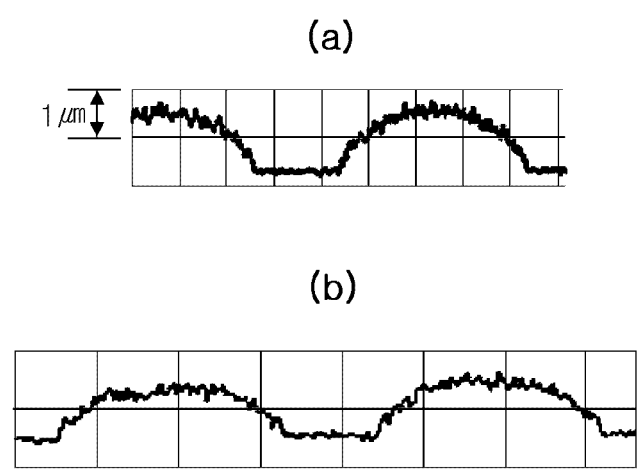
FIGS. 8A and 8B are views showing respective cross-sectional shapes of internal electrodes when the internal electrodes are printed by using a conductive paste for an internal electrode deviating from an appropriate weight ratio.

FIGS. 8A and 8B are views showing respective cross-sectional shapes of printed internal electrodes when the internal electrodes are printed by using a conductive paste for an internal electrode deviating from an appropriate weight ratio.

FIG. 8A shows a cross-sectional shape of printed internal electrodes when 0.1 wt % or lower of a thiol or a hydrocarbon is included in the conductive paste for an internal electrode.

FIG. 8B shows a cross-sectional shape of printed internal electrodes when 0.4 wt % or higher of a thiol or a hydrocarbon is included in the conductive paste for an internal electrode.

As shown in FIGS. 8A and 8B, it was confirmed that, when the additive is included within the range of 0.1 wt % or lower and 0.4 wt % or higher, improvement in cross-sectional shapes of printed internal electrodes was not distinctive.

Therefore, the additive including a thiol or a hydrocarbon may be included in an amount of 0.1 to 0.4 wt %.

As such, after the internal electrode layers 21 and 22 are formed, the green sheets are separated from carrier films, and then a plurality of the green sheets are laminated while overlapping each other, to thereby form a green sheet laminate (FIG. 3C).

Then, the plurality of the green sheets forming a green sheet laminate are compressed at a relatively high temperature and a relatively high pressure (FIG. 3D), and then the compressed sheet laminate is cut into a predetermined size through a cutting process (FIG. 3E), to thereby manufacture a green chip (FIG. 3F).

Thereafter, plasticizing, firing, and polishing are performed to manufacture the ceramic body 10, and then a process of forming external electrodes 3 and a plating process may be performed to complete a multilayer ceramic capacitor.

In the multilayer ceramic capacitor manufactured through the processes as described above, the ends of the internal electrodes may have a shape close to a right angle.

In addition, in the multilayer ceramic capacitor manufactured through the processes as described above, the roughness (surface roughness) of the internal electrode may be improved by improving a leveling property (leveling: a function of leveling a surface) of the conductive paste for an internal electrode.

As set forth above, according to the embodiments of the present invention, a conductive paste for an internal electrode having a large difference in viscosity in a process of manufacturing a multilayer ceramic electronic component may be provided to a user.

Further, according to an embodiment of the present invention, a method of manufacturing a multilayer ceramic electronic component capable of improving a contact angle defect of the conductive paste for an internal electrode may be provided to a user.

Further, according to the present invention, a multilayer ceramic electronic component and a method of manufacturing the same, capable of improving phase stability of the conductive paste for an internal electrode, may be provided to a user.

Further, according to the present invention, a multilayer ceramic electronic component in which an end of the internal electrode has a shape closer to a right angle and a method of manufacturing the same may be provided to a user.

Further, according to the present invention, a multilayer ceramic electronic component in which roughness (surface roughness) of the internal electrode is improved by improving a leveling property (leveling: a function of leveling a surface) of the conductive paste for an internal electrode may be provided to a user.

While the present invention has been shown and described in connection with the embodiments, it will be apparent to those skilled in the art that modifications and variations can be made without departing from the spirit and scope of the invention as defined by the appended claims.

What is claimed is:

1. A conductive paste composition for an internal electrode, the conductive paste composition comprising:
a metal powder; and
an additive including at least one selected from thiols and hydrocarbons.

2. The conductive paste composition of claim 1, wherein, when the additive includes at least one selected from the thiols and the hydrocarbons, the additive has a content of 0.1 to 0.4 wt %.

3. The conductive paste composition of claim 1, wherein the conductive paste composition has a viscosity varied within the range of 1 to 1000 Pa·s.

4. A method of manufacturing a multilayer ceramic electronic component, the method comprising:
preparing ceramic green sheets;
printing a conductive paste for an internal electrode on the respective ceramic green sheets, the conductive paste including a metal powder, a solvent, a binder, and an additive; and
laminating the ceramic green sheets on which the conductive paste for an internal electrode is printed,
the additive including at least one selected from glutamic acid, amino acids, thiols, and hydrocarbons.

5. The method of claim 4, wherein the additive is a monomer.

6. The method of claim 4, wherein, when the additive includes at least one selected from the glutamic acid and the amino acids, the additive has a content of 0.5 to 2 wt %.

7. The method of claim 4, wherein, when the additive includes at least one selected from the thiols and the hydrocarbons, the additive has a content of 0.1 to 0.4 wt %.

8. The method of claim 4, wherein in the printing of the conductive paste for an internal electrode, the conductive paste has a viscosity varied within the range of 1 to 1000 Pa·s.

9. The method of claim 4, further comprising firing the laminated ceramic green sheets.

10. A multilayer ceramic electronic component, manufactured by printing a conductive paste for an internal electrode including an additive, a metal powder, a solvent, and a binder, on ceramic green sheets, the additive including at least one of glutamic acid, amino acid, thiols, and hydrocarbons, and laminating the ceramic green sheets on which the conductive paste for an internal electrode is printed.

11. The multilayer ceramic electronic component of claim 10, wherein, when the additive includes at least one selected from the glutamic acid and the amino acids, the additive has a content of 0.5 to 2 wt %.

12. The multilayer ceramic electronic component of claim 10, wherein, when the additive includes at least one selected from the thiols and the hydrocarbons, the additive has a content of 0.1 to 0.4 wt %.

\* \* \* \* \*